(12) United States Patent
Takami (10) Patent No.: US 9,530,144 B2
(45) Date of Patent: Dec. 27, 2016

(54) CONTENT OUTPUT DEVICE, CONTENT OUTPUT METHOD, CONTENT OUTPUT PROGRAM, AND RECORDING MEDIUM HAVING CONTENT OUTPUT PROGRAM RECORDED THEREON

(75) Inventor: Shinya Takami, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 57 days.

(21) Appl. No.: 13/699,163

(22) PCT Filed: May 23, 2011

(86) PCT No.: PCT/JP2011/061727
§ 371 (c)(1),
(2), (4) Date: Nov. 20, 2012

(87) PCT Pub. No.: WO2011/148884
PCT Pub. Date: Dec. 1, 2011

(65) Prior Publication Data
US 2013/0067513 A1    Mar. 14, 2013

(30) Foreign Application Priority Data

May 28, 2010    (JP) .................................. 2010-122495

(51) Int. Cl.
| | | |
|---|---|---|
| *H04N 7/10* | (2006.01) |
| *G06Q 30/00* | (2012.01) |
| *G06Q 30/02* | (2012.01) |
| *H04N 21/454* | (2011.01) |
| *H04N 21/81* | (2011.01) |

(52) U.S. Cl.
CPC .......... *G06Q 30/02* (2013.01); *G06Q 30/0241* (2013.01); *H04N 21/454* (2013.01); *H04N 21/812* (2013.01)

(58) Field of Classification Search
CPC ............................ G06Q 30/02; G06Q 30/0241
USPC .................................... 709/203, 224; 725/34
See application file for complete search history.

(56) References Cited

U.S. PATENT DOCUMENTS

| | | | | |
|---|---|---|---|---|
| 7,504,942 B2 * | 3/2009 | Marman | ........................ | 340/541 |
| 7,643,658 B2 * | 1/2010 | Kilner | ................ | G06K 9/00221 |
| | | | | 382/103 |
| 8,509,539 B2 * | 8/2013 | Yu | ....................... | G06K 9/00228 |
| | | | | 382/190 |
| 8,694,495 B2 * | 4/2014 | Saito | ................... | G06F 17/3002 |
| | | | | 707/713 |

(Continued)

FOREIGN PATENT DOCUMENTS

| | | |
|---|---|---|
| CN | 201383313 Y | 1/2010 |
| JP | 2000-268235 A | 9/2000 |

(Continued)

*Primary Examiner* — An Son P Huynh
(74) *Attorney, Agent, or Firm* — Sughrue Mion, PLLC (57) ABSTRACT

An information providing device associates in advance and stores a characteristic element which is a candidate to be specified from an image, with content. Further, the information providing device is configured to specify a difference between characteristic elements by comparing a characteristic element specified from a currently acquired image with a characteristic element specified from an image acquired prior to (in the past) the image, and acquire content associated with the characteristic element related to the difference, and display the content on a display.

10 Claims, 3 Drawing Sheets

(56) References Cited

U.S. PATENT DOCUMENTS

| | | | |
|---|---|---|---|
| 2002/0046100 A1* | 4/2002 | Kinjo | G06F 3/011 705/14.66 |
| 2002/0072952 A1 | 6/2002 | Hamzy et al. | |
| 2003/0093200 A1* | 5/2003 | Gutta | G08B 13/19602 701/45 |
| 2004/0119826 A1* | 6/2004 | Yunoki | H04M 1/27455 348/207.1 |
| 2005/0177847 A1* | 8/2005 | Konig | G06F 17/30802 725/41 |
| 2005/0289582 A1* | 12/2005 | Tavares | G06K 9/00221 725/10 |
| 2006/0204058 A1* | 9/2006 | Kim | G06K 9/00288 382/118 |
| 2007/0088818 A1* | 4/2007 | Roberts et al. | 709/224 |
| 2007/0140532 A1* | 6/2007 | Goffin | G06K 9/00288 382/118 |
| 2007/0245368 A1* | 10/2007 | Kawai | H04H 60/33 725/28 |
| 2008/0301751 A1* | 12/2008 | Naito | H04N 21/4334 725/139 |
| 2009/0100050 A1* | 4/2009 | Erol et al. | 707/5 |
| 2009/0133051 A1* | 5/2009 | Hildreth | H04N 5/4403 725/28 |
| 2009/0138805 A1* | 5/2009 | Hildreth | G06K 9/00335 715/745 |
| 2010/0104256 A1* | 4/2010 | Tsurumi | 386/69 |
| 2010/0158358 A1* | 6/2010 | Lienhart et al. | 382/162 |
| 2011/0112890 A1* | 5/2011 | Chu | G06Q 30/02 705/7.33 |
| 2011/0140840 A1* | 6/2011 | Hardacker | H04N 5/66 340/5.83 |
| 2011/0167110 A1* | 7/2011 | Hoffberg et al. | 709/203 |
| 2011/0295693 A1* | 12/2011 | Clavin et al. | 705/14.66 |
| 2012/0154557 A1* | 6/2012 | Perez | H04N 21/25891 348/53 |

FOREIGN PATENT DOCUMENTS

| | | |
|---|---|---|
| JP | 2002-140603 A | 5/2002 |
| JP | 2002-259270 A | 9/2002 |
| JP | 2004-227158 A | 8/2004 |
| JP | 2007-265125 A | 10/2007 |
| JP | 2009-109887 A | 5/2009 |
| JP | 2010-113313 A | 5/2010 |

\* cited by examiner

CHARACTERISTIC ELEMENT DATABASE 312

| RECORD No. | DATE | TIME | CHARACTERISTIC ELEMENT ||||||||| |
|---|---|---|---|---|---|---|---|---|---|---|
| | | | PERSON | HAT | EYEGLASSES | PIERCES | MASK | NECKTIE | CLOTHES | PET | .... |
| 850 | MAY 1, 2010 | 10:00:00 | NUMBER: 1 HAIR STYLE: LONG HAIR COLOR: BLONDE ......... | NUMBER: 1 COLOR: BLACK | NUMBER: 1 TYPE: RIMMED SHAPE: ROUND COLOR: BLACK | NUMBER: 0 | NUMBER: 0 | NUMBER: 0 | NUMBER: 1 TYPE: .... COLOR: RED | NUMBER: 0 | ..... |
| 849 | MAY 1, 2010 | 9:59:50 | NUMBER: 2 HAIR STYLE: (1) SHORT AND (2) LONG HAIR COLOR: (1) BLACK AND (2) BROWN ......... | NUMBER: 0 | NUMBER: 0 | NUMBER: 0 | NUMBER: 1 | NUMBER: 0 | NUMBER: 2 COLOR: (1) RED AND (2) BLUE | NUMBER: 0 | ..... |
| 848 | MAY 1, 2010 | 9:59:40 | NUMBER: 1 HAIR STYLE: LONG HAIR COLOR: BLACK ......... | NUMBER: 0 | NUMBER: 0 | NUMBER: 0 | NUMBER: 0 | NUMBER: 0 | NUMBER: 1 TYPE: SUIT COLOR: RED | NUMBER: 0 | ..... |
| 847 | MAY 1, 2010 | 9:59:30 | NULL |||||||| |
| 846 | MAY 1, 2010 | 9:59:20 | NUMBER: 5 ......... | NUMBER: 0 | NUMBER: 0 | NUMBER: 0 | NUMBER: 0 | NUMBER: 0 | NUMBER: 5 ......... | NUMBER: 0 | ..... |
| ..... | ..... | ..... | ..... | ..... | ..... | ..... | ..... | ..... | ..... | ..... | ..... |

↑ LATEST RECORD

FIG.4

CONTENT OUTPUT DEVICE, CONTENT OUTPUT METHOD, CONTENT OUTPUT PROGRAM, AND RECORDING MEDIUM HAVING CONTENT OUTPUT PROGRAM RECORDED THEREON

CROSS REFERENCE TO RELATED APPLICATIONS

This application is a National Stage of International Application No. PCT/JP2011/061727 filed May 23, 2011, claiming priority based on Japan Patent Application No. 2010-122495 filed May 28, 2010, the contents of all of which are incorporated herein by reference in their entirety.

TECHNICAL FIELD

The present invention relates to a technical field such as a system which displays content such as advertisement information matching information related to viewers.

BACKGROUND ART

Conventionally, a system is known which arbitrarily switches advertisement information displayed on a monitor inside or outside a public building based on attribute information of a user (viewer) (for example, Patent Literature 1). This system can switch advertisement information to advertisement information matching the user by acquiring the attribute information of the user (for example, information such as a sex, an age, a preference and etc.) from a mobile terminal which the user has. Patent Literature 2 also discloses a device which displays advertisement information matching attribute information of a user in this way.

Meanwhile, Patent Literature 3 discloses a copy machine which captures an image of a user's face using a camera, extracts a feature amount from image data of the captured image, refers to a correspondence table registered in advance and detects an attribute (sex) of the user matching the feature amount. Further, this copy machine displays content matching the detected attribute of the user.

CITATION LIST

Patent Literature

Patent Literature 1: Japanese Patent Application Laid-Open No. 2002-259270
Patent Literature 2: Japanese Patent Application Laid-Open No. 2000-268235
Patent Literature 3: Japanese Patent Application Laid-Open No. 2002-140603

SUMMARY OF THE INVENTION

Problem to be Solved by the Invention

Similar to the above conventional technique, a method of displaying advertisement information matching attribute information of a user cannot prevent content which the user is not interested in from being displayed. However, this method displays for the same attribute information the same advertisement information at all the time, and has a problem that a viewer who views content gets bored and content loses appealing power. Further, there is also a method of simply selecting and displaying content at random from multiple items of contents selected based on, for example, attribute information of a user such that the same content is not presented to the same viewer. However, according to this method, the content is likely to be influenced by temporal and seasonal characteristic elements (such as a muffler, a pair of gloves and a coat in winter). Therefore, there is a problem that it is difficult to present content which attracts viewers' attention, and cannot increase appealing power of content.

The present invention is made in light of the above problem, and an object of the present invention is to provide a content output device, a content output method, a content output program, and a recording medium having the content output program having recorded thereon which can increase appealing power of content.

Means for Solving the Problem

In order to solve the above problem, the invention according to claim 1 is a content output device comprising:
an image acquiring means that acquires an image;
a characteristic element specifying means that specifies a characteristic element from the image acquired from the image acquiring means based on characteristic elements stored in a content memory means that associates and stores characteristic elements which are candidates to be specified from the image, with content;
a difference specifying means that specifies a difference between characteristic elements by comparing the characteristic element specified from the image acquired by the image acquiring means, with the characteristic element specified from an image acquired prior to the image and stored in a characteristic element memory means; and
an output means that outputs content associated with the characteristic element related to the specified difference.

The present invention is configured to specify a difference between characteristic elements by comparing a characteristic element specified from a currently acquired image and a characteristic element specified from an image acquired prior to the image, and output content associated with the characteristic elements related to the difference, so that it is possible to prevent a viewer who views the content from getting bored and increase appealing power of the content.

The invention according to claim 2 is the content output device according to claim 1,
wherein the characteristic element specifying means specifies a group based on a distance between the specified characteristic elements, and specifies a characteristic element belonging to the specified group, as the characteristic element of the image; and
the difference specifying means specifies the difference between the characteristic elements by comparing the characteristic element specified from the image, with the characteristic element specified from an image acquired prior to the image.

The present invention can increase appealing power of content including the characteristic element belonging to the specified group.

The invention according to claim 3 is the content output device according to claim 1 or 2,
wherein the content memory means stores content which varies per time zone; and
the content acquiring means acquires content matching a time zone including a current time.

The present invention can output content matching each age group matching a time zone and, consequently, further increase appealing power of the content.

The invention according to claim 4 is the content output device according to any one of claims 1 to 3, wherein the content memory means stores content matching a combination of a plurality of different characteristic elements; and the content acquiring means acquires content matching a combination of the characteristic elements related to the difference.

The present invention can output content matching a combination of a plurality of characteristic elements and, consequently, further increase appealing power of the content.

The invention according to claim 5 is the content output device according to any one of claims 1 to 4, wherein the image acquiring means acquires an image captured by an imaging device.

The invention according to claim 6 is the content output device according to any one of claims 1 to 5, wherein when the characteristic element cannot be specified from the image by the characteristic specifying means, the characteristic element memory means stores information indicating that the characteristic element cannot be specified; and when information indicating a characteristic element which is a comparison target is not stored in the characteristic element memory means, the difference specifying means specifies the characteristic element specified from the image acquired by the image acquiring means as the difference between the characteristic elements.

The invention according to claim 7 is a method of outputting content, which is executed by a computer comprising:

an image acquiring step of acquiring an image;

a characteristic element specifying step of specifying a characteristic element from the acquired image based on characteristic elements stored in a content memory means that associates and stores characteristic elements which are candidates to be specified from the image, with content;

a difference specifying step of specifying a difference between characteristic elements by comparing the characteristic element specified from the acquired image, with the characteristic element specified from an image acquired prior to the image and stored; and an output step of outputting content associated with the characteristic element related to the specified difference.

The invention according to claim 8 is a content output program causing a computer to function as:

an image acquiring means that acquires an image;

a characteristic element specifying means that specifies a characteristic element from the image acquired from the image acquiring means based on characteristic elements stored in a content memory means that associates and stores characteristic elements which are candidates to be specified from the image, with content;

a difference specifying means that specifies a difference between characteristic elements by comparing the characteristic element specified from the image acquired by the image acquiring means, with the characteristic element specified from an image acquired prior to the image and stored in a characteristic element memory means; and an output means that outputs content associated with the characteristic element related to the specified difference.

The invention according to claim 9 is a recording medium having a computer-readable content output program recorded thereon which causes a computer to function as:

an image acquiring means that acquires an image;

a characteristic element specifying means that specifies a characteristic element from the image acquired from the image acquiring means based on characteristic elements stored in a content memory means that associates and stores characteristic elements which are candidates to be specified from the image, with content;

a difference specifying means that specifies a difference between characteristic elements by comparing the characteristic element specified from the image acquired by the image acquiring means, with the characteristic element specified from an image acquired prior to the image and stored in a characteristic element memory means; and an output means that outputs content associated with the characteristic element related to the specified difference.

Advantageous Effects of Invention

The present invention is configured to specify a difference between characteristic elements by comparing a characteristic element specified from a currently acquired image and a characteristic element specified from an image acquired prior to the image, and output content associated with the characteristic elements related to the difference, so that it is possible to prevent a viewer who views the content from getting bored and increase appealing power of the content.

MODE FOR CARRYING OUT THE INVENTION

An embodiment of the present invention will be described in detail below with reference to the drawings. In addition, the embodiment where the present invention is applied to an information providing system will be described below.

[1. Outline of Configuration and Function of Information Providing System]

First, an outline of a configuration and a function of an information providing system S according to the present embodiment will be described using FIG. 1.

Figure 1:
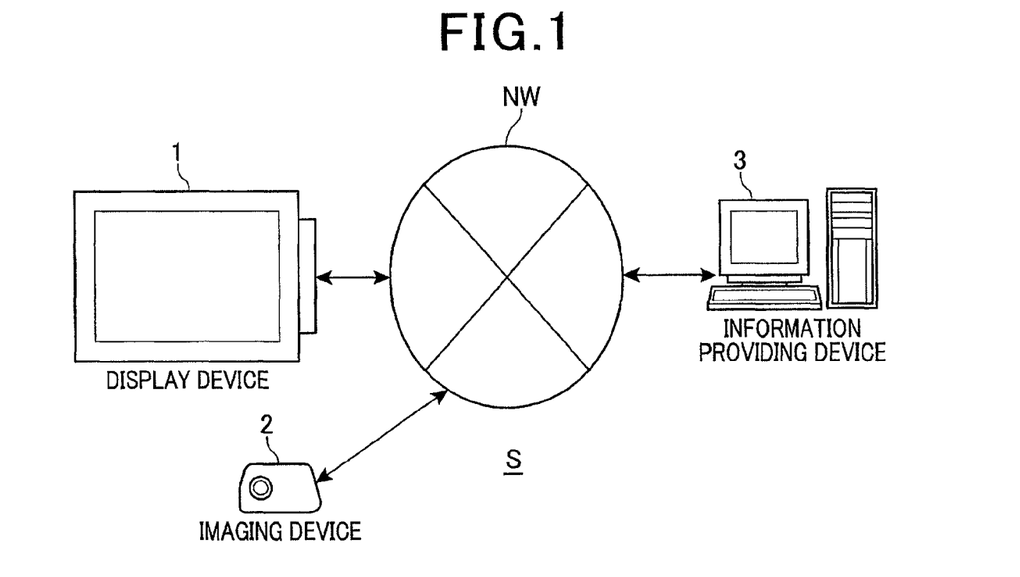
FIG. 1 is a view illustrating an example of a schematic configuration of a content providing system S according to the present embodiment.

FIG. 1 is a view illustrating an example of a schematic configuration of the information providing system S according to the present embodiment.

As illustrated in FIG. 1, the information providing system S is configured to include, for example, a display device 1, an imaging device 2 and an information providing device 3 (an example of a content output device). The display device 1, the imaging device 2 and the information providing device 3 are each connected to a network NW, and can transmit and receive data to and from each other.

In addition, the network NW may be a small network configured with a LAN (Local Area Network), or a large network configured with a WAN (Wide Area Network) including Internet.

The display device 1 has, for example, a display, a display control unit and a communication unit. The display control unit includes, for example, a CPU (Central Processing Unit), a RAM (Random Access Memory) and a ROM (Read Only Memory), and receives content output from the information providing device 3 through the network NW and the communication unit and displays the content on a display. The display (monitor) is set at, for example, a position inside or outside a public building which can be visually checked by people. Further, the communication unit of the display device 1 connects to the network NW and communicates with the information providing device 3.

In addition, the display device 1 is applicable to advertisement media which display information by means of a digital signage, an electronic signboard, an electronic display board, a digital display board, a dynamic signage, an interactive signage, a digital POP (Point of purchase advertising), a digital sign, a digital display signage, a digital content distributing system, an electronic POP, an electronic poster, an electronic board, an electronic information board, an electronic advertisement board and a projector.

The imaging device 2 has, for example, a camera and a communication unit. The camera is set, for example, near the display of the display device 1 and at a position from which images of people looking at the display can be captured. Further, data of an image of a subject captured by the camera is transmitted to the information providing device 3 through the communication unit and the network NW. Furthermore, the communication unit of the imaging device 2 connects to the network NW and communicates with the information providing device 3.

The information providing device 3 is formed with, for example, one or a plurality of server computers including a function such as a web server, an application server and a database server.

Figure 2:
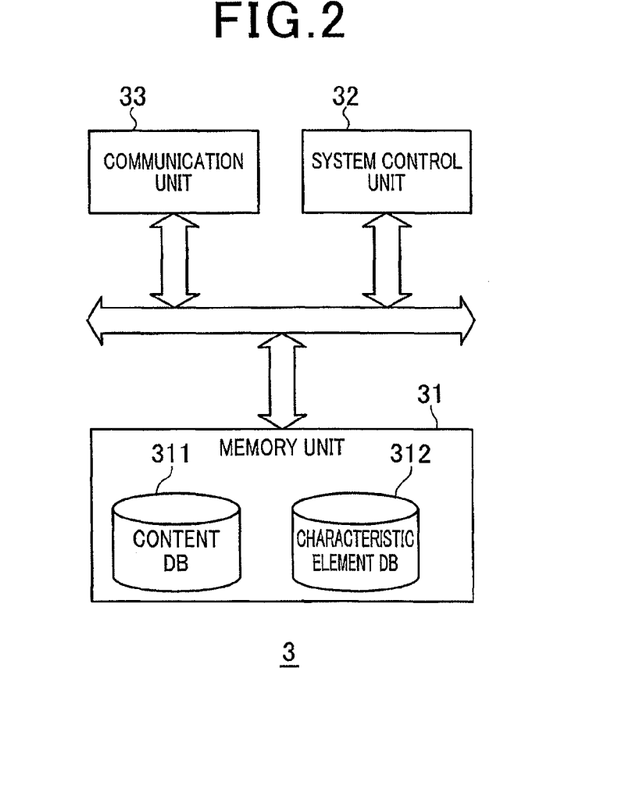
FIG. 2 is a block diagram illustrating an example of a schematic configuration of an information providing device 3.

FIG. 2 is a block diagram illustrating an example of a schematic configuration of the information providing device 3.

As illustrated in FIG. 2, the information providing device 3 roughly has a memory unit 31, a system control unit 32 and a communication unit 33.

The memory unit 31 has, for example, a hard disk drive, and stores an operating system and an application program (including, for example, a content output program according to the present invention). In addition, for example, the content output program according to the present invention may be downloaded from another server through the network NW, or may be recorded in a recording medium such as a CD-ROM or read through the drive.

Further, in the memory unit 31, for example, a content database (DB) 311 (an example a content memory means) and a characteristic element database (DB) 312 (an example of a characteristic element memory means) are constructed.

In the content database 311, a plurality of characteristic elements which are candidates to be specified from an image, and content associated with each characteristic element are registered.

Meanwhile, the characteristic element refers to characteristic information which can be specified from, for example, a person (a person or an object accompanying the person) area included in an image. The characteristic element is, for example, a person, a hat, a pair of eyeglasses, a pair of pierces, a pair of earrings, a necklace, a mask, a muffler, a pair of gloves, a coat, a necktie, clothes and a pet. Further, when a characteristic element is a person, the number of people, the sex, the height, a hair style, a hair color, a hair length, a color of eyebrows, the shape of the eyebrows, the length of eyelashes, a color of eyes, a color of a lip, a skin color, whether or the person has a beard and whether or not the person has a wrinkle can also be included as characteristic elements. Furthermore, when a characteristic element is an object such as a hat, a pair of eyeglasses, a pair of pierces, a pair of earrings, a necklace, a mask, a necktie or clothes, the type (for example, a pair of eyeglasses with rims or a pair of eyeglasses without rims), the shape and the color of the object can also be included as characteristic elements. Still further, when a characteristic element is a pet, the type (for example, a cat or a dog), the size, and the color of the pet can also be included as characteristic elements.

To specify such a characteristic element, for example, a known object recognition algorithm can be applied. The object recognition algorithm is directed to recognizing an object by extracting information such as gradient information and edge information from image data, and comparing the information with correct (candidate) data prepared in advance. In addition, the object recognition algorithm can adopt a technique such as known SIFT (Scale Invariant Feature Transform) or SURF (Speeded-Up Robust Features), and therefore will not be described in more details.

Further, content to be associated with each characteristic element which is a candidate is advertisement information which is specialized in each characteristic element, and is data including at least one of a movie, a still image and text data. When, for example, a characteristic element is the number of people, advertisement information matching each number of people (advertisement information is different when, for example, the number of people is less than five and is six or more) is registered in the content database 311 as content. Further, when a characteristic element is a hair style of a person, advertisement information matching each hair style (advertisement information is different when, for example, the hair style is long hair or short hair) is registered in the content database 311 as content. Furthermore, when a characteristic element is an object (for example, a pair of eyeglasses), advertisement information of this object is registered in the content database 311 as content matching the characteristic element. Still further, advertisement information matching the type, the shape and the color of the object may be registered as content.

Thus, a plurality of items of contents matching each characteristic element are registered in the content database 311. Further, a configuration may be employed where, in the content database 311, content matching a combination of a plurality of different characteristic elements (for example, a combination of "a pair of eyeglasses, a mask and a hat" or a combination of "a hair style, a hair color, a color of eyebrows, the shape of the eyebrows and a color of eyes") is also registered. Furthermore, a configuration may be employed where content matching each characteristic element (or a combination of characteristic elements) is registered in the content database 311 per time zone (for example, a time zone from 6 o'clock to 10 o'clock, a time zone from 10 o'clock to 14 o'clock, a time zone from 14 o'clock to 17 o'clock and a time zone from 17 o'clock to 21 o'clock) (that is, even in case of the identical characteristic element, content to be associated varies per time zone).

Meanwhile, in the characteristic element database 312, each characteristic element specified from an image captured at predetermined time intervals by the camera of the imaging device 2 and acquired by the information providing device 3 is registered as a record together with a corresponding date (for example, a date on which an image is acquired or a date on which a characteristic element is specified).

Figure 3:
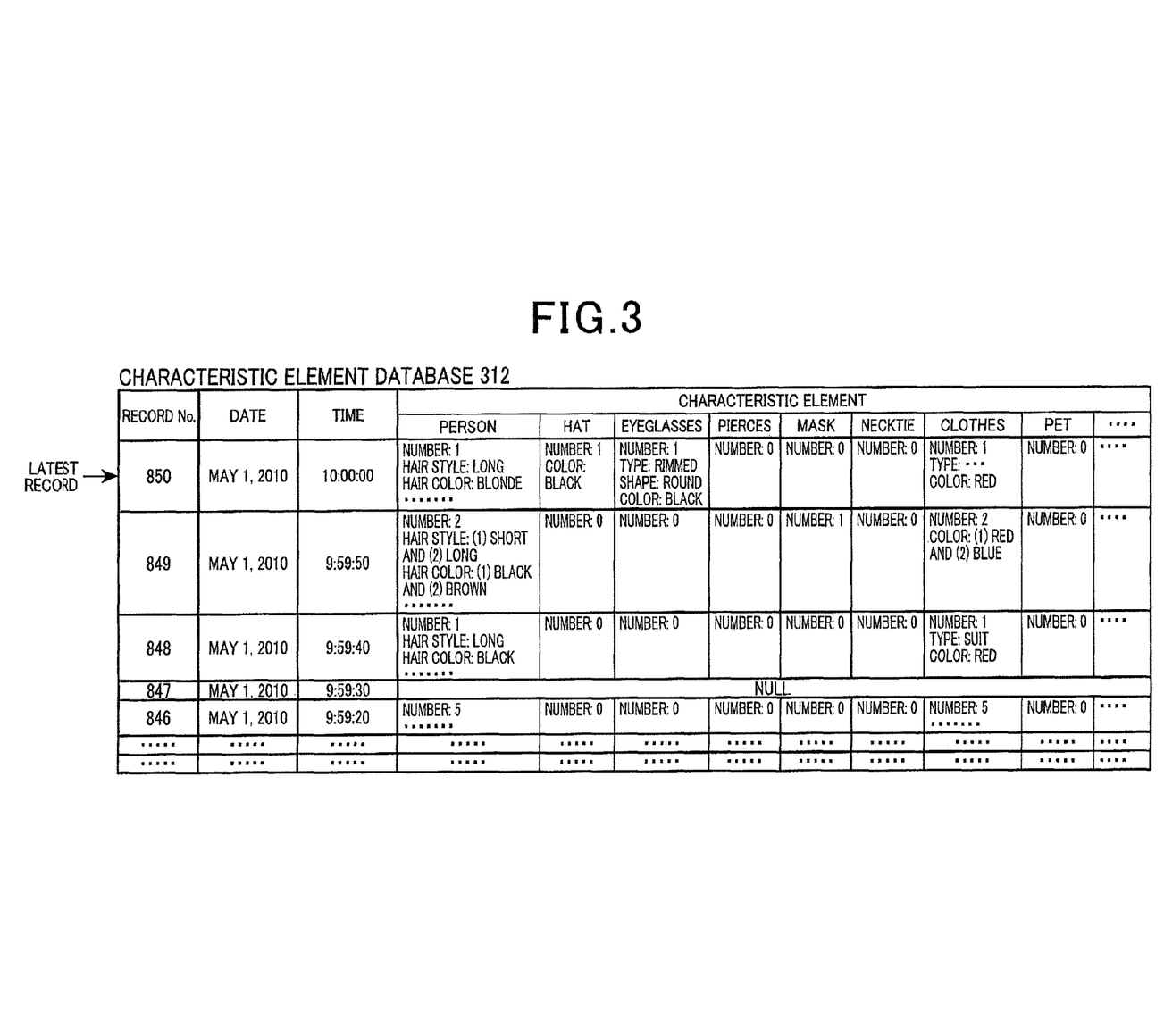
FIG. 3 is a view illustrating an example of information registered in a characteristic element database 312.

FIG. 3 is a view illustrating an example of records registered in the characteristic element database 312. With an example illustrated in FIG. 3, characteristic elements included in a record registered in the characteristic element database 312 change as the time passes.

The system control unit 32 has, for example, a CPU, a RAM and a ROM. Further, when the CPU reads and executes a server program stored in the ROM and the memory unit 31, the system control unit 23 functions as, for example, an image acquiring means, a characteristic element specifying means, a difference specifying means, a content acquiring means and an output means according to the present invention, and performs processing which is described below.

The communication unit 33 connects to the network NW, and communicates with the display device 1 and the imaging device 2.

[2. Operation of Information Providing System]

Next, an operation of the information providing system S according to the present embodiment will be described using, for example, FIG. 4.

Figure 4:
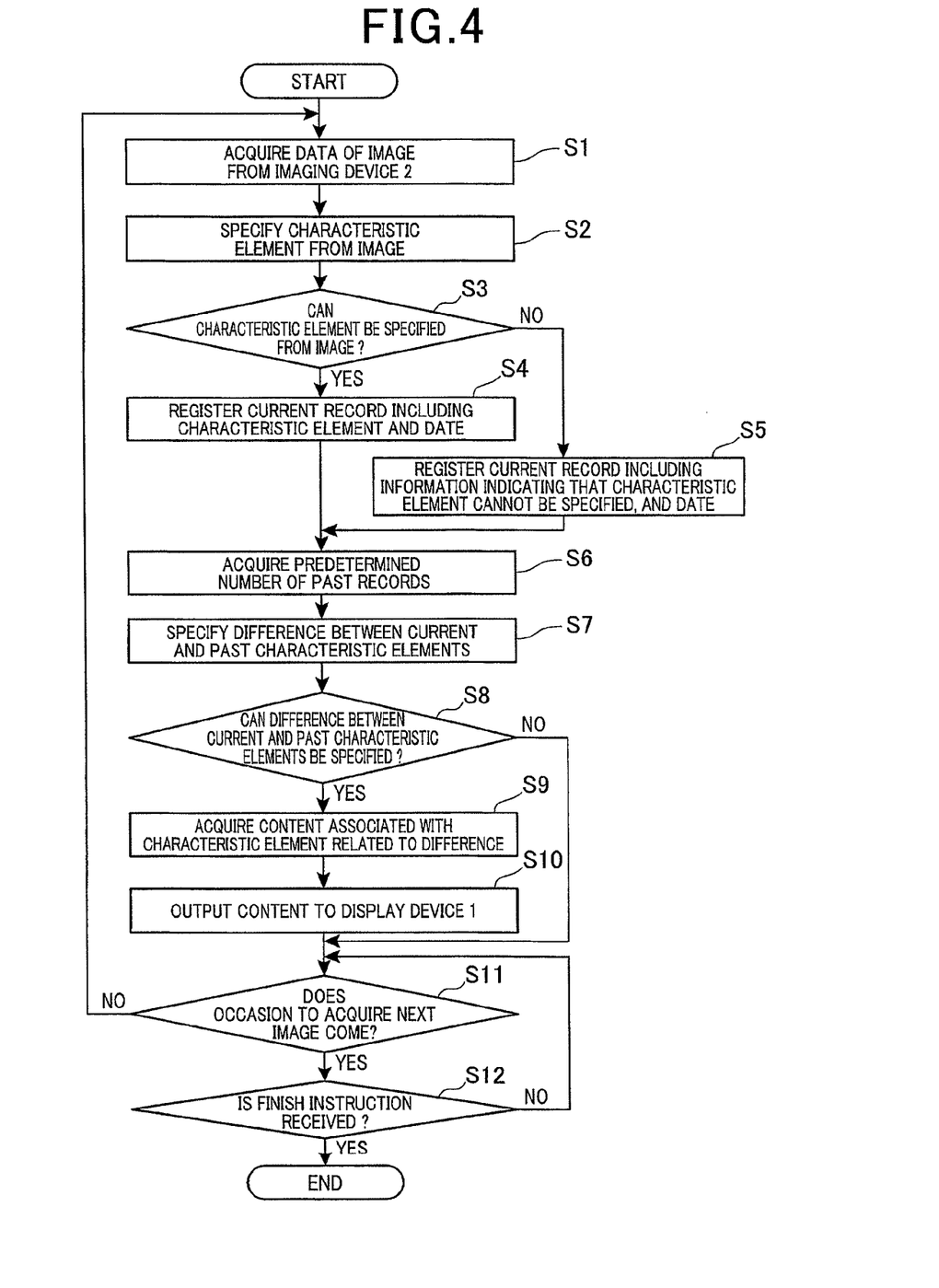
FIG. 4 is a flowchart illustrating information providing processing in a system control unit 32 of the information providing device 3.

FIG. 4 is a flowchart illustrating information providing processing in the system control unit 32 of the information providing device 3.

Processing illustrated in FIG. 4 is started by activating an application program for outputting content according to, for example, an activation instruction from a system administrator. Thus, an image acquisition occasion deciding timer starts counting, and, in step S1, the system control unit 32 requests for an image from the imaging device 2 and acquires data of an image of a subject captured by the camera from the imaging device 2 through the network NW (stores the data in a predetermined area of the RAM). In addition, the image acquisition occasion deciding timer is set to, for example, ten seconds.

Next, the system control unit 32 performs processing of specifying a characteristic element from the image acquired in step S1 based on characteristic elements (candidates) registered in the content database 311 (step S2). More specifically, the system control unit 32 specifies the characteristic element by recognizing an object such as a person area according to the object recognition algorithm, and deciding the coincidence between the object and the characteristic element (candidate) registered in the content database 311. According to this processing, one or a plurality of characteristic elements are specified in some cases, and a characteristic element cannot be specified in some cases. In addition, upon decision of the coincidence, whether or not, for example, both items of data related to characteristic elements match at a threshold or more (for example, 90%) set in advance.

Next, the system control unit 32 decides whether or not characteristic elements can be specified from an image in the processing in step S2 (step S3). Further, the system control unit 32 proceeds to step S4 when deciding that one or more characteristic elements are specified (step S3: YES), and proceeds to step S5 when a characteristic element cannot be specified (step S3: NO).

In step S4, the system control unit 32 registers a current record including one or more specified characteristic elements a corresponding date in the characteristic element database 312, and proceeds to step S6. In addition, the current record is temporarily stored in the RAM until the next record is registered.

Meanwhile, in step S5, the system control unit 32 registers a current record including information indicating that a characteristic element cannot be specified (NULL; corresponding to a record of No. 847 with the example illustrated in FIG. 3) and a corresponding date in the characteristic element database 312, and proceeds to step S6.

In step S6, the system control unit 32 acquires a predetermined number of records registered prior to (in the past) the current record (latest record) registered in step S4 or S5. The past records to be acquired may be, for example, only one previous record or may be the previous and a predetermined number of records tracked back from the previous record, and are set.

Next, the system control unit 32 performs processing of specifying a difference between characteristic elements by comparing characteristic elements included in the current record and characteristic elements included in the past records acquired in step S6 (step S7).

Although, for example, a pair of eyeglasses is not included in the characteristic elements of the past records, if, for example, one pair of eyeglasses is included in the characteristic elements of the current record, the difference between the characteristic elements is specified as "a pair of eyeglasses".

Alternatively, when, for example, the number of people included in the characteristic elements of the past records and the number of people included in the characteristic elements of the current record are different, the difference between the characteristic elements is specified as "the number of people".

Alternatively, when, for example, a hair style (for example, short hair) of a person included in characteristic elements of the past records and a hair style (for example, long hair) of a person included in characteristic elements of the current record are different, the difference between characteristic elements is specified as "a hair style".

Alternatively, although, for example, "a pair of eyeglasses, a mask and a hat" are included in characteristic elements of the past records, if "a pair of eyeglasses, a mask and a hat" are included in characteristic elements of the current record, the difference between the characteristic elements is specified as "a pair of eyeglasses, a mask and a hat".

In addition, when a characteristic element is not included in the past records (information indicating that a characteristic element cannot be specified is included), characteristic elements included in the current record are specified as a difference between the characteristic elements.

Next, the system control unit 32 decides whether or not the difference between the current and past characteristic elements according to the processing in step S7 (step S8). Further, the system control unit 32 proceeds to step S9 when deciding that the difference between the current and past characteristic elements can be specified (step S8: YES), and proceeds to step S11 when deciding that the difference between the current and past characteristic elements cannot be specified (step S8: NO). When the difference between the current and past characteristic elements cannot be specified, content displayed on the display of the display device 1 is not switched.

In addition, the system control unit 32 may be configured to count the number of differences between the current and past characteristic elements in step S8 and proceed to step S11 regarding that the difference cannot be specified when the counted number is a predetermined number or less (for example, three) and is small. When, for example, the predetermined number is three, it is regarded that the difference cannot be specified based on two differences of a hair style of a person and a hat alone, and therefore content is not switched. By this means, it is possible to prevent content from being switched more than necessary.

In step S9, the system control unit 32 acquires content associated with the characteristic elements related to the difference specified in step S7, from the content database 311.

For example, content associated with a characteristic element (for example, a pair of eyeglasses) which is included in the current record and which is a difference is acquired.

Alternatively, content associated with a combination of characteristic elements (for example, a pair of eyeglasses, a mask and a hat) which are included in the current record and which are differences is acquired.

Alternatively, content associated with the number of people which is a characteristic element which is included in the current record and which is the difference is acquired.

Next, the system control unit 32 outputs (transmits) the content acquired in step S9 to the display device 1 through the network NW (step S10). By this means, the system control unit 32 outputs content associated with a characteristic element related to the difference specified in step S7, to the display device 1. That is, the content output from the system control unit 32 is received by the display device 1. The display control unit of the display device 1 stores the received content in the memory unit (for example, rewrites previously received and stored content), and outputs and displays the content to and on the display. That is, the previously received and stored content is switched to the currently received content. In addition, a configuration may be employed where each content matching each of the above characteristic elements (content registered in the content database 311) is stored in the memory unit of the display device 1 in association with identification information (ID) unique to each characteristic element. In this case, the system control unit 32 transmits information indicating the characteristic element related to the difference specified in step S7 (for example, identification information unique to the characteristic element) to the display device 1 through the network NW to output content associated with the characteristic element to the display device 1. That is, when receiving the information indicating the characteristic element, the display device 1 acquires the content associated with the information, and displays the content on the display. According to this configuration, it is possible to reduce influences of a response speed upon reception of content (due to a load on the network NW) by the display device 1 and a time lag upon content switching, and present the content to viewers in more real time.

In step S11, the system control unit 32 decides whether or not an occasion to acquire the next image comes. Further, when deciding that the occasion to acquire the next image has not come (step S11: NO), the system control unit 32 proceeds to step S12. Meanwhile, when the image acquisition occasion deciding timer counts up, the system control unit 32 decides that the occasion to acquire the next image has comes (step S11: YES), returns to step S1 (in this case, the image acquisition occasion deciding timer is reset), and performs the same processing as the above. Thus, the information providing device 3 acquires an image every time an occasion to acquire the image comes (at predetermined time intervals), and, when there is a difference between the current and past characteristic elements, outputs content associated with the characteristic elements related to the difference, to the display device 1.

In step S12, the system control unit 32 decides whether or not a finish instruction is received, and returns to step S11 when the finish instruction is not received (step S12: NO) and finishes the processing illustrated in FIG. 4 when the finish instruction is received (step S12: YES).

As described above, according to the above embodiment, the information providing device 3 is configured to specify the difference between characteristic elements by comparing a characteristic element specified from a currently acquired image and a characteristic element specified from an image acquired prior to (in the past) the image, output content associated with the characteristic elements related to the difference and display the content on a display, so that it is possible to present content which attracts viewers' attention, prevent the viewers who view the content from getting bored and increase appealing power of the content. When, for example, many people put on mufflers on a cold winter day, these mufflers are not the difference between characteristic elements, so that it is possible to remove content related to these mufflers, that is, content which does not attract viewers' attention from a presentation target.

In addition, the system control unit 32 may be configured to specify the difference between characteristic elements in step S7 by specifying a group based on a distance between specified characteristic elements (for example, people), specifying characteristic elements belonging to the specified group as characteristic elements of an image and comparing the characteristic elements specified from the image and the characteristic elements specified from an image acquired prior to (in the past) the image. For example, the system control unit 32 calculates a distance between the specified characteristic elements, and specifies a plurality of characteristic elements between which the distance is a predetermined distance (for example 1 to 2 m) or less as one group. Meanwhile, the system control unit 32 may be configured to specify a group only when the number of characteristic elements between which the calculated distance is within a predetermined distance is a predetermined number (for example, three people) or more. In addition, when the specified characteristic elements are people, the distance between people can be found by calculating the distance between the eyes of the specified people. According to this configuration, it is possible to display content matching the difference between the past and current characteristic elements in the specified group and, consequently, increase appealing power of content such as people belonging to this group.

Further, the system control unit 32 may be configured to acquire content which is associated with characteristic elements related to the difference and which matches a time zone including the current time in step S9. According to this configuration, it is possible to display content matching each age group matching a time zone and, consequently, further increase appealing power of content. Further, the system control unit 32 may also be configured to store history information of content output to the display device 1, and acquire content different from previously acquired content in step S9. According to this configuration, it is possible to prevent the same content from being selected and, consequently, prevent viewers who view the content from getting bored.

In addition, although the present embodiment has been described using the information providing device 3 as an example of the content output device according to the present invention, the present invention can also be applied to a personal computer (having a build-in or externally-connected camera) installed at a location which is commonly used. Further, a display device having a display may be configured to have an image acquiring means, a characteristic element specifying means, a difference specifying means, a content acquiring means and an output means according to the present invention (the display device may further have an imaging means), and perform the above processing from acquisition to an output of content without the network NW.

REFERENCE SIGNS LIST

1 DISPLAY DEVICE
2 IMAGING DEVICE
3 INFORMATION PROVIDING DEVICE
31 MEMORY UNIT
32 SYSTEM CONTROL UNIT
33 COMMUNICATION UNIT
NW NETWORK
S INFORMATION PROVIDING SYSTEM

The invention claimed is:

1. A content output device comprising:
at least one memory operable to store program codes;
at least one processor that executes the program codes and operates as instructed by the program codes, the program codes including:
image acquiring code that causes the at least one processor to acquire an image captured by an imaging device through a communication network, wherein the image device periodically captures the image at a preset time interval set by a timer connected with the at least one processor;
characteristic element specifying code that causes the at least one processor to specify a characteristic element from the image acquired by the image acquiring code based on a first comparison between the image and a plurality of preset characteristic elements stored in a content memory, wherein the content memory stores content associated with at least one preset characteristic element from among the plurality of preset characteristic elements;
difference specifying code that causes the at least one processor to specify an element included in a characteristic element of a current image and not included in a characteristic element of a previous image, which is a target of second comparison, as a different characteristic element between the previous image and the current image, the previous image being acquired prior to the current image and stored in a characteristic element memory;
output code that causes the at least one processor to output content stored in the content memory and associated with the characteristic element related to the specified different characteristic element on a display device through the communication network; and
count code that causes the at least one processor to count a number of differences between the characteristic elements in the previous image and the current image, wherein the output content being displayed on the display device is not switched in response to the counted number of differences between the characteristic elements in the previous image and the current image being less than a predetermined number,
wherein the output content excludes a content related to a characteristic element that is common between the current image and the previous image.

2. The content output device according to claim 1,
wherein the characteristic element specifying code causes the at least one processor to specify a group comprising a plurality of characteristic elements located within a predetermined distance from one another within the acquired image; and
the difference specifying code causes the at least one processor to specify the different characteristic element between the characteristic elements of the current image and the previous image by comparing the plurality of characteristic elements of the group specified from the current image with the plurality of characteristic elements of the group specified from the previous image acquired prior to the current image.

3. The content output device according to claim 2,
wherein the content memory stores content which varies per time zone; and the content output device further comprises
content acquiring code that causes the at least one processor to acquire content matching a time zone including a current time.

4. The content output device according to claim 2,
wherein when the characteristic element cannot be specified from the previous image by the characteristic specifying code, the characteristic element memory stores information indicating that the characteristic element of the previous image cannot be specified; and
based on the information indicating that the characteristic element of the previous image cannot be specified, stored in the characteristic element memory, the difference specifying code causes the at least one processor to specify the characteristic element specified from the current image acquired by the image acquiring code as the different characteristic element between the characteristic elements of the current image and the previous image.

5. The content output device according to claim 1,
wherein the content memory stores content which varies per time zone; and the content output device further comprises
content acquiring code that causes the at least one processor to acquire content matching a time zone including a current time.

6. The content output device according to claim 5,
wherein when the characteristic element cannot be specified from the previous image by the characteristic specifying code, the characteristic element memory stores information indicating that the characteristic element of the previous image cannot be specified; and
based on the information indicating that the characteristic element of the previous image cannot be specified, stored in the characteristic element memory, the difference specifying code causes the at least one processor to specify the characteristic element specified from the current image acquired by the image acquiring code as the different characteristic element between the characteristic elements of the current image and the previous image.

7. The content output device according to claim 1,
wherein when the characteristic element cannot be specified from the previous image by the characteristic specifying code, the characteristic element memory stores information indicating that the characteristic element of the previous image cannot be specified; and
based on the information indicating that the characteristic element of the previous image cannot be specified, stored in the characteristic element memory, the difference specifying code causes the at least one processor to specify the characteristic element specified from the current image acquired by the image acquiring code as the different characteristic element between the characteristic elements of the current image and the previous image.

8. The content output device according to claim 1, wherein the first comparison and the second comparison are different.

9. The content output device according to claim 1, wherein
   a characteristic element specified from an image is registered as a record, together with time at which the image is acquired, respective images being captured at different timings, and
   the characteristic element specifying code causes the at least one processor to specify the different characteristic element by acquiring one or more past records, registered prior to a current record, and comparing a characteristic element included in the current record and a characteristic element included in the one or more past records.

10. A method of outputting content, which is executed by a computer comprising:
   acquiring an image captured by an imaging device through a communication network, wherein the image device periodically captures the image at a preset time interval set by a timer connected with the at least one processor;
   specifying a characteristic element from the acquired image based on a first comparison between the image and a plurality of preset characteristic elements stored in a content memory, wherein the content memory stores content associated with at least one preset characteristic element from among the plurality of preset characteristic elements;
   specifying an element included in a characteristic element of a current image and not included in a characteristic element of a previous image, which is a target of comparison, as a different characteristic element between the previous image and the current image, the previous image being acquired prior to the current image and stored;
   outputting content stored in the content memory and associated with the characteristic element related to the specified different characteristic element on a display device through the communication network; and
   counting a number of differences between the characteristic elements in the previous image and the current image, wherein the output content being displayed on the display device is not switched in response to the counted number of differences between the characteristic elements in the previous image and the current image being less than a predetermined number,
   wherein the output content excludes a content related to a characteristic element that is common between the current image and the previous image.

* * * * *